United States Patent
Müller-Vivil

(10) Patent No.: US 10,694,762 B2
(45) Date of Patent: Jun. 30, 2020

(54) SUGAR-FREE HARD DRAGEE

(71) Applicant: Alexander Müller-Vivil, Offenburg (DE)

(72) Inventor: Alexander Müller-Vivil, Offenburg (DE)

(*) Notice: Subject to any disclaimer, the term of this patent is extended or adjusted under 35 U.S.C. 154(b) by 0 days.

(21) Appl. No.: 16/164,944

(22) Filed: Oct. 19, 2018

(65) Prior Publication Data
US 2019/0230953 A1 Aug. 1, 2019

(30) Foreign Application Priority Data
Jan. 31, 2018 (EP) .................................. 18154484

(51) Int. Cl.
| | | |
|---|---|---|
| *A23G 3/54* | (2006.01) | |
| *A23G 3/38* | (2006.01) | |
| *A23G 3/42* | (2006.01) | |
| *A23G 3/34* | (2006.01) | |

(52) U.S. Cl.
CPC .............. *A23G 3/54* (2013.01); *A23G 3/343* (2013.01); *A23G 3/38* (2013.01); *A23G 3/42* (2013.01); *A23G 2200/06* (2013.01); *A23G 2220/20* (2013.01); *A23V 2002/00* (2013.01); *A23V 2200/132* (2013.01); *A23V 2200/22* (2013.01); *A23V 2250/2482* (2013.01); *A23V 2250/5028* (2013.01); *A23V 2250/6402* (2013.01); *A23V 2250/642* (2013.01); *A23V 2250/6412* (2013.01); *A23V 2250/6416* (2013.01)

(58) Field of Classification Search
CPC ..................................... A23G 3/54; A23G 3/38
See application file for complete search history.

(56) References Cited

U.S. PATENT DOCUMENTS

| | | | |
|---|---|---|---|
| 4,127,645 A | 11/1978 | Witzel et al. | |
| 5,536,511 A | 7/1996 | Yatka | |
| 2002/0028276 A1 | 3/2002 | Rapp et al. | |
| 2003/0198713 A1 | 10/2003 | Clark et al. | |
| 2007/0031535 A1* | 2/2007 | Robinson | A23G 3/008 426/5 |
| 2008/0184992 A1 | 8/2008 | Arenz | |
| 2012/0021910 A1 | 1/2012 | Parrish | |
| 2016/0021910 A1 | 1/2016 | Muller-Vivil | |

FOREIGN PATENT DOCUMENTS

| | | |
|---|---|---|
| EP | 0201412 | 11/1986 |
| EP | 0415656 | 3/1991 |
| EP | 0625311 | 11/1994 |
| EP | 1057414 | 12/2000 |
| EP | 1234506 | 8/2002 |
| WO | WO 2011/082050 | 7/2001 |
| WO | WO 2011/131313 | 10/2011 |

OTHER PUBLICATIONS

USPTO Office Action, dated Mar. 2, 2018, issued in U.S. patent publication No. US 2016/0021910 pp. 1-19.
USPTO Office Action, dated Oct. 11, 2018, issued in U.S. patent publication No. US 2016/0021910 pp. 1-37.
European Search Report issued in parallel application No. 18154484. 2, dated Apr. 24, 2018 (7 pages), Apr. 24, 2018—considered as disclosed—not in English.

* cited by examiner

*Primary Examiner* — Kelly J Bekker
(74) *Attorney, Agent, or Firm* — Nash and Titus, LLC.

(57) ABSTRACT

The subject matter of the invention is a sugar-free hard dragee consisting of a compressed core and a hard coating completely surrounding the compressed core, wherein the hard dragee is sugar-free. The compressed core contains a mixture of erythritol. D-sorbitol and steviol whereas the hard coating contains a mixture of D-maltitol, erythritol and *stevia*/steviol. The hard dragees according to the invention surprisingly have a good compatibility in spite off the combination of sugar replacement substances and non-sugar sweeteners. Moreover, the compressed cores of the hard dragees according to the invention have a very good compressibility.

9 Claims, No Drawings

SUGAR-FREE HARD DRAGEE

The subject matter of the invention is a sugar-free hard dragee consisting of a compressed core and a hard coating completely surrounding the compressed core, wherein the hard dragee is sugar-free.

Bonbons and confectionary products are offered in many different forms and variants. A popular form is dragees. Dragees have a core and an outer jacket, also called a coating. According to the Federal Association of the German Confectionary Industry e.V., dragees are named either according to their core or their outer coating. For example, chewing dragees, love pearls, chocolate lenses or chocolate dragees are popular. In hard dragees the outer coating consists of sugar or sugar replacement substances with a low residual moisture of less than 3% and forms a fine, crystalline outer coating which is hard as glass. In soft dragees the outer coating consists, e.g., of sugar with few additives and low residual moisture.

For reasons of health, sugar-free confectionary is becoming increasingly popular since they have fewer calories than products containing sugar and especially when polyols are used as sugar replacement substances they are good for the teeth and independent of insulin and are therefore suitable for diabetics. However, when sugar replacement substances and non-sugar sweeteners are used, the traditional manufacturing methods for confectionary can frequently not be used since the sugar replacement substances and non-sugar sweeteners have other processing qualities. In addition, some sugar replacement substances have, especially in a rather large amount, a laxative effect and can lead to flatulence. In particular in the case of maltitol and sorbitol, a laxative effect occurs when exceeding a certain received amount.

EP 0 96 161 describes sugar-free, coated chewing bonbons. Based on the problems discussed in the during the manufacturing process, isomalt is used as a sugar replacement substance in order to obtain the desired texture and a crispy, non-sticky dragee cover. In contrast to hard dragees, chewing bonbons should not be too hard in order that the consumer it can chew them well. The manufacture of hard dragees is not described.

The present application has the problem of making available a hard dragee that overcomes the above problems, is sugar-free, can be produced on an industrial scale and in particular has a good taste and good sensory and organoleptic qualities.

The problem is solved by the invention by a hard dragee according to Claim 1.

Other embodiments constitute subject matter of the subclaims or are described below.

The sugar-free hard dragee according to the invention consists of a compressed core and a hard coating which completely surrounds the compressed core. The hard dragee according to the invention is sugar-free. The compressed core contains as sugar replacement substances a mixture of erythritol, isomalt and D-sorbitol and at least one non-sugar sweetener selected from *stevia*/steviol, *stevia*/steviol, aspartame, acesulfame or sucralose. The hard coating contains as sugar replacement substances a mixture of D-maltitol and erythritol and as non-sugar sweeteners at least one substance selected from *stevia*/steviol, aspartame, acesulfame-K and sucralose, preferably aspartame.

The hard dragee according to the invention preferably contains as sugar replacement substances and non-sugar sweeteners in the compressed core only a mixture of erythritol, isomalt, D-sorbitol and aspartame and in the hard coating only a mixture of D-maltitol, erythritol and at least one sweetening agent selected from steviol, aspartame, acesulfame-K and sucralose and no other sugar replacement substances or non-sugar sweeteners in the hard dragee.

The term "sugar-free" denotes in the sense of the invention free of beet sugar or cane sugar, that is, free of saccharose which are added for example, as sugar-containing confectionary such as refined sugar, white sugar, half-white sugar, liquid sugar or inverted sugar.

Hard dragees in the sense of the invention are dragees with a solid, hard, compressed core and a hard, crystalline, smooth coating layer on the core, i.e., a hard coating. For the hard coating, a solution, preferably an oversaturated solution, is applied on the core once or multiple times which crystallizes on the core and therefore forms the crystalline coating. The shape of the hard coating corresponds to the shape of the core since the hard coating is only a covering of the compressed core. The hard coating surrounds the compressed core completely, i.e., the entire surface of the compressed core is covered.

The compressed core is, according to the invention, a solid, hard, compressed core and forms the center of the hard dragee. It is in particular not chewing gum, no chewing mass and no natural product or chocolate. The compressed cores are not very hygroscopic. The compressed core can have any shape. For example, it has the shape of a ball, an ellipsoid, a lens, a cylinder a tetrahedron, a pyramid, a parallelepiped, a drop, a star or a heart.

Sugar replacement substances are naturally occurring and rather sweet-tasting carbohydrates. Frequently used sugar replacement substances are the sugar alcohols (polyols). The calorific value of sugar replacement substances is below the calorific value of sugar.

Non-sugar sweeteners have no or only a very low energy content and are multiply sweeter than sugar. Typical non-sugar sweeteners are natural or synthetic compounds such as, e.g., saccharin, cyclamate aspartame, acesulfame and steviol.

The compressed core preferably contains as sugar replacement substances and non-sugar sweeteners:
  30-45 wt. % erythritol, preferably 35-42 wt %, especially preferably 37-40 wt. % erythritol,
  30-45 wt. % D-sorbitol, preferably 35-42 wt. %, especially preferably 37-40 wt. % D-sorbitol,
  15-25 wt. % isomalt, especially preferably 15-20 wt. %, especially preferably 18-20 wt. % isomalt,
  0.01-0.2 wt. % aspartame, preferably 0.02-0.09 wt.-%, especially preferably 0.03-0.07 wt. % aspartame,
  relative to the total weight of the compressed core. The compressed core especially preferably contains no other sugar replacement substances or non-sugar sweeteners.

The compressed core especially preferably contains as sugar replacement substances and non-sugar sweeteners:
  37-40 wt. % erythritol,
  37-40 wt. % D-sorbitol
  18-20 wt. % isomalt,
  0.01-0.2 wt. % aspartame,
  relative to the total weight of the compressed core and preferably no other sugar replacement substances or non-sugar sweeteners.

In a preferred embodiment the compressed core consists of
  93.8-99.695 wt. % sugar replacement substance preferably 94.0-97.5 wt. %, sugar replacement substance
  0.005-0.2 wt. % non-sugar sweetener, preferably 0.1-0.2 wt. %,
  0.20-1.0 wt. % aroma and 0.1-5 wt.-%, preferably 0.4-2.0 wt. % auxiliary agents, preferably binding agents/separating agents, wherein the components of the compressed core supplement themselves to 100 wt. %.

Suitable auxiliary agents in the compressed core are, for example, dies, vitamins, mineral substances, acids such as tartaric acid, malic acid, citric acid or lactic acid, and tableting auxiliary agents such as binding agents and separating agents, e.g., stearates, mono- and diglycerides or fats and oils. The compressed core preferably contains as auxiliary substances only tableting auxiliary agents and/or dies and/or vitamins and/or mineral substances.

The hard dragee according to the invention can also be polished at the end of the production process with 0-0.1% carnauba wax.

The hard dragee preferably contains as sugar replacement substances and non-sugar sweeteners:
55-70 wt. % D-maltitol, preferably 58-62 wt. % D-maltitol,
5-10 wt. % erythritol, preferably 5-7 wt. % erythritol,
0.0001-0.1 wt. % *stevia* and/or aspartame, preferably 0.005-0.1 wt. % aspartame, relative to the total weighed portion of the components of the hard coating before the heating. The hard coating especially preferably contains no other sugar replacement substances or non-sugar sweeteners.

In a preferred embodiment the hard coating consists after the heating (without water) of
78-84 wt.-% D-maltitol,
5-10 wt. % erythritol, preferably 8-10 wt. %,
0.005-0.1 wt. % *stevia* and/or aspartame,
0.01-2.0 wt. % aroma and
0.01-2.0 wt. % auxiliary substances, preferably gum arabic, wherein the components of the hard coating supplement themselves to 100 wt. %.

Erythritol with a grain size of ≥200 mg to 1000 mg is preferably used in the compressed core of the hard dragee according to the invention.

Suitable auxiliary substances in the hard coating are, for example, dies, gum arabic and/or antioxidants.

In one embodiment, part of the hard coating is an aroma solution, e.g., a vanilla solution. The aroma solution is a component of the coating and an aroma solution is also added in the core.

All advantageous areas cited for the hard dragee, the compressed core and the hard coating can be combined with each other even if the combinations are not literally named.

The residual water content of the hard coating is 0.5-3.0 wt. %, preferably 2.5 to 3 wt. %.

The hard dragee according to the invention preferably consists of
20-80 wt./%, preferably 40-50 wt. % compressed core and
20-80 wt./%, preferably 50-60 wt. % hard coating, relative to the total weight of the hard dragee. The hard dragee according to the invention can be additionally provided with an outer layer of the polishing agent carnauba wax.

In the hard dragee according to the invention the preferred embodiment of the compressed core is preferably combined with the preferred embodiment of the hard coating.

The hard dragees according to the invention surprisingly have a good combination of processing qualities and qualities of use. The hard dragees according to the invention can be pressed well, have a good tablet hardness and structure and at the same time have a good taste and a good compatibility. The compressed cores of the hard dragees according to the invention have in particular a very good ability to be compressed whereas a number of combinations of sugar replacement substances result in granulates which are difficult to compress or cannot be compressed at all.

Whereas other combinations of contained substances lead to a pasty structure of the compact which heavily adversely affects the oral result, the hard dragee according to the invention has a hard, strong core. The hard dragees according to the invention behave when being sucked like sugar-containing products whereas other sugar-free confectionary causes the effect of a strong sensation of coldness in the buccal cavity, which also negatively influences the oral result. The hard dragees according to the invention do not have this problem of a cooling effect.

The hard dragees according to the invention surprisingly have, in spite of the combination of sugar replacement substances and non-sugar sweeteners, a good compatibility and in particular do not result in stomach problems such as a growling stomach and/or a formation of gas in the intestinal area.

The hard dragee according to the invention is preferably a mini-dragee, e.g., the weight per dragee is preferably 0.1 to 1 g, especially preferably 0.3 to 0.6, more preferably 0.4 to 0.5 g.

EXAMPLE

The invention is explained in detail using the following example:

A compressed core according to the invention and a hard coating according to the invention were produced based on the following compositions:

Compressed Core:

|  | Amount in wt. % |
| --- | --- |
| Sorbitol | 37.55 |
| Erythritol | 37.55 |
| Isomalt | 18.78 |
| Tartaric acid | 1.45 |
| Lactic acid | 1.00 |
| Magnesium stearate | 1.25 |
| MCT oil | 0.64 |
| Aspartame | 0.13 |
| Aroma | 1.65 |

Hard Coating:

|  | Amount in % |
| --- | --- |
| Maltitol | 63.42 |
| Water | 27.03 |
| Erythritol | 6.29 |
| Aroma | 2.03 |
| Gum arabic | 0.85 |
| Tartaric acid | 0.34 |
| Carnauba wax | 0.02 |
| Aspartame | 0.01 |
| Ascorbic acid | 0.01 |

In order to produce a granulate for the compressed core, D-sorbitol was mixed for 3 min with the aromas and MCT oil, a middle-chain triglyceride. Subsequently, the other additives isomalt, erythritol, acids, non-sugar sweeteners and magnesium stearate were added and the mixture mixed for about another 2 min. The granulate mixture was sieved by a sieve and made available for the compressing.

The tablet press was prepared for the compressing of the compressed cores. The granulate was filled via a filling funnel into the tablet press and compressed to compressed cores.

The coating solution was prepared in that erythritol was heated with water to 98° C. The remaining additives were subsequently weighed according to the recipe and dispersed in. The homogeneous coating solution was tempered for further use to a temperature of 60° C.

The solution was now sprayed onto the compressed cores and different layers were additionally sprinkled with maltite powder until they were dry. The different coating layers were dried with air, during which a large part of the aqueous solution (added water but also residual moisture of the other additives used) evaporated.

The residual water content of the coating after the drying was 1-3 wt. %. Aroma was added into individual coating layers. The coating process was repeated until the desired weight was reached. Finally, the dragees were polished with carnauba wax.

The invention claimed is:

1. A sugar-free hard dragee comprising a compressed core and a hard coating completely surrounding the compressed core, wherein
   the compressed core contains as sugar replacement substances and non-sugar sweeteners a mixture of
   30-45 wt. % erythritol,
   30-45 wt. % D-sorbitol,
   15-25 wt. % isomalt, and
   0.01-0.2 wt % non-sugar sweeteners,
   relative to the total weight of the compressed core,
      wherein the compressed core contains no other sugar replacement substances or non-sugar sweeteners besides the erythritol, the D-sorbitol, the isomalt, and the non-sugar sweeteners,
and
   the hard coating contains as sugar replacement substances and non-sugar sweeteners a mixture of D-maltitol, erythritol and at least one non-sugar sweetener selected from the group consisting of aspartame, acesulfame, sucralose and *stevia*/steviol.

2. The hard dragee according to claim 1, wherein the compressed core contains as sugar replacement substances and non-sugar sweeteners:
   37-40 wt. % erythritol,
   37-40 wt. % D-sorbitol, and
   18-20 wt. % isomalt,
relative to the total weight of the compressed core.

3. The hard dragee according to claim 1, wherein the compressed core further includes aroma and auxiliary agents.

4. The hard dragee according to claim 1, wherein the hard coating is formed by heating a coating solution which contains as sugar replacement substances and non-sugar sweeteners:
   55-70 wt. % D-maltitol,
   5-10 wt. % erythritol, and
   0.0001-0.1 wt. % non-sugar sweeteners,
relative to the total weighed portion of the components of the hard coating before heating.

5. The hard dragee according to claim 1, wherein the hard coating by dry weight consists of
   78-84 wt. % D-maltitol,
   5-10 wt. % erythritol,
   0.005-0.1 wt. % aspartame,
   0.01-2.0 wt. % aroma,
   0.01-2.0 wt. % auxiliary substances,
wherein the components of the hard coating supplement themselves to 100 wt. %.

6. The hard dragee according to claim 5, wherein the auxiliary substance is gum arabic.

7. The hard dragee according to claim 1, wherein the hard dragee comprises
   20-80 wt. %, compressed core and
   20-80 wt %, hard coating,
relative to the total weight of the hard dragee.

8. The hard dragee according to claim 1, wherein the hard dragee comprises
   40-50 wt. % compressed core and
   50-60 wt. % hard coating,
relative to the total weight of the hard dragee.

9. The hard dragee according to claim 7, wherein the hard coating contains no other sugar replacement substances other than D-maltitol and erythritol.

* * * * *